UNITED STATES PATENT OFFICE.

JOHN H. ARNER, OF NEW MAHONING, PENNSYLVANIA.

COMPOSITION FOR CENTER-PIECES, &c.

SPECIFICATION forming part of Letters Patent No. 423,108, dated March 11, 1890.

Application filed March 30, 1889. Serial No. 305,449. (No specimens.)

*To all whom it may concern:*

Be it known that I, JOHN H. ARNER, a citizen of the United States, residing at New Mahoning, in the county of Carbon, State of Pennsylvania, have invented certain new and useful Improvements in Composition for Center-Pieces, &c.; and I do hereby declare the following to be a full, clear, and exact description of the invention, such as will enable others skilled in the art to which it appertains to make and use the same.

This invention relates to improvements in the construction of center-pieces, cornices, moldings, and similar ornamental figures or beadings.

The improvement, briefly stated, consists in the production of a composition consisting of about equal parts of paper, wood, rope, or other pulp, bran, and sawdust, to which sometimes cotton-seed hulls and rice-hulls are added, and a binder composed of rye-flour paste, said composition being intimately mixed together and pressed into the desired form between molds or dies of suitable configuration, and dried while within said molds or dies.

Center-pieces for ceilings and for ornamenting other portions of a room, ornamental cornices, moldings, beadings, and the like, have heretofore been constructed of a variety of materials—such, for instance, as of cardboard alone, and of varied compositions of matter, either with or without a backing of paper, card-board, or other material. According to my invention I construct such ornamental devices of a composition consisting of about equal parts of paper, wood, rope, or other pulp, bran, sawdust, and cotton-seed hulls and rice-hulls. These several ingredients are either first steamed or soaked in water of suitable temperature to bring them to a soft, pliable condition, and then intimately mixed together, or they may be first intimately mixed together and then subjected to the steaming or soaking process, as found most convenient in individual cases. To and throughout this mass, after such steaming or soaking, I then add and intimately mix therewith a paste composed of rye-flour and water, to bring the composition to a doughy state and secure the coherence thereof. By the employment of rye-flour paste the adherence together of the several constituents of the composition is secured, the rye-flour paste affording a smooth binding vehicle, increasing the pliability and plasticity of the composition, and being a much cheaper and equally-effective binding and adherent vehicle than glue and kindred vehicles, besides being more readily prepared and mixed with the composition. When the composition has thus been prepared by the admixture and steaming or soaking of the several ingredients and the admixture therewith of the rye-flour paste, a sufficient quantity of such composition, according to the size and thickness of the ornamental device to be formed, is then placed within the appropriate design formed in a female die or mold, which may be of any desired or suitable construction. A male die of corresponding design to the design formed in the female die is then brought down upon the female die and the composition then pressed within the latter. The dies or molds are then clamped or otherwise secured together in any suitable or known manner, and, with the composition therein, are placed within a suitable drier or kiln, where they are suffered to remain until the composition within said dies or molds has become dried and hardened and the design set, whereupon said dies or molds are removed from the drier and the ornament removed from said molds. The center-piece, molding, or other ornament is then in readiness for application, and can be readily secured in position by nails or other suitable devices. The dies may, if desired, be constructed with suitable lugs or pins and recesses, so as, in the molding operation, to form nail-holes through the center-piece or other ornamental device being molded.

The employment of bran in a moistened and heated state and under pressure secures advantageous results in the combination described, inasmuch as the glutinous character of the bran is thereby brought out and materially assists in securing the thorough and tenacious binding together of the ingredients. The employment of the hulls is also advantageous in this connection in that they are light and bulky. They, when moistened and subjected to pressure, as stated, readily combine with the other ingredients and permit of the securing of a homogeneous product which will be considerably lighter than an ornament of the same size would be where material of such light yet bulky character is not employed. By this combination of ingredients, therefore, center-pieces and other decorative pieces can be constructed of considerable size when desired, yet of extreme lightness—an advantage in most instances, such as in handling, transportation, and in the ease with which the ornaments may be supported in position.

Before the composition is placed in position within the female die or mold both of the molds or dies are oiled to prevent the composition adhering thereto during the molding operation.

Having thus described my invention, what I claim is—

1. The composition herein described, consisting of pulp, bran, sawdust, and rye-flour.

2. The composition herein described, consisting of pulp, bran, sawdust, hulls, and a binder composed of rye-flour paste.

In testimony whereof I affix my signature in the presence of two witnesses.

JOHN H. ARNER.

Witnesses:
JACOB W. RAUDENBUSH,
JONATHAN KISTLER.